United States Patent [19]

Farkas

[11] Patent Number: 5,311,062
[45] Date of Patent: May 10, 1994

[54] TRANSIENT-FREE SYNCHRONOUS ELECTRICAL POWER MACHINE

[76] Inventor: Otto Farkas, 1464 Graves Ave. #107, El Cajon, Calif. 92021

[21] Appl. No.: 903,120

[22] Filed: Jun. 23, 1992

Related U.S. Application Data

[63] Continuation-in-part of Ser. No. 680,543, Apr. 4, 1991, abandoned.

[51] Int. Cl.⁵ .......................... H02J 9/00; H02J 3/28
[52] U.S. Cl. .................................. 290/4 R; 290/1 R; 310/116; 310/117
[58] Field of Search ............... 290/4 R, 1 R; 310/112, 310/114, 115, 116, 117

[56] References Cited

U.S. PATENT DOCUMENTS

| | | | |
|---|---|---|---|
| 336,780 | 2/1886 | Ball | 310/116 |
| 465,999 | 12/1891 | Shaw | 310/116 |
| 543,523 | 7/1895 | Fiske | 310/117 |
| 2,002,793 | 5/1935 | Park | 310/116 |
| 3,029,374 | 4/1962 | Pichon | 310/117 |
| 4,827,152 | 5/1989 | Farkas | 290/4 R |

*Primary Examiner*—A. D. Pellinen
*Assistant Examiner*—Robert Lloyd Hoover
*Attorney, Agent, or Firm*—Henri J. A. Charmasson

[57] ABSTRACT

Proximity switches and circumferentially movable stator windings allow a motor-generator to simultaneously sense and switch from a synchronous motor position to a synchronous generator position. This mechanism replaces the conventional separate sensing and switching of motor-generator functions. Automatic rotational repositioning of the stator maintains constant voltage and prevents the generation of transient voltages or harmonics. The stator flux leads the rotor magnetic flux slightly in an import power or motor position, creating a torque on the rotor and a counter torque on the stator reacted by the fixed casing of the apparatus. As the stator field weakens due to a failure of the normal power supply, the counter torque also weakens and the stator windings is biased to begin to turn with the rotor until the rotor and stator fields are in step, i.e., when virtually no current is generated or consumed or until a full export power or generator position is reached. The dynamic stator may also be used in electric motors or generators to filter or cushion variations in the power supply or in the load.

8 Claims, 3 Drawing Sheets

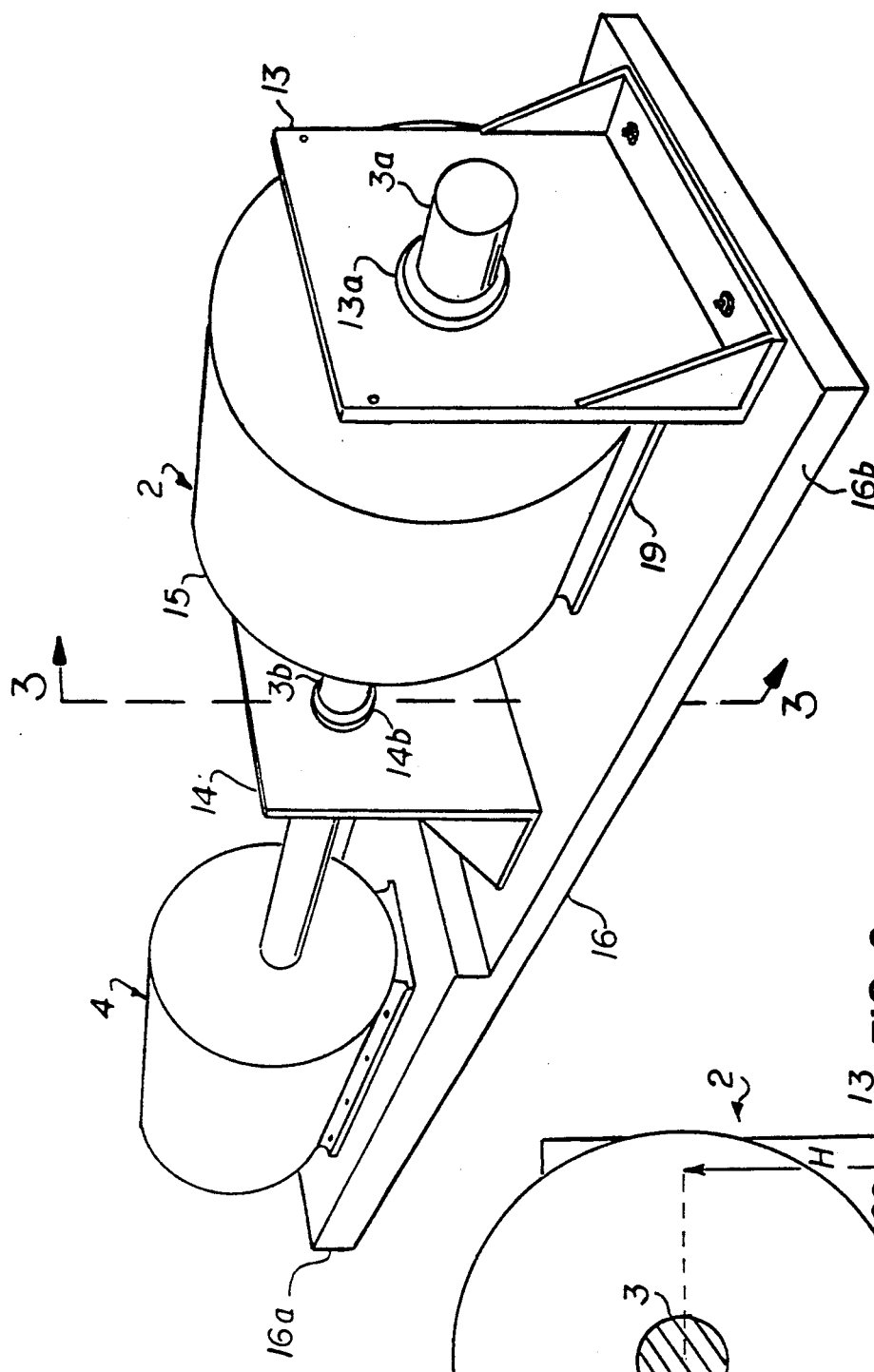
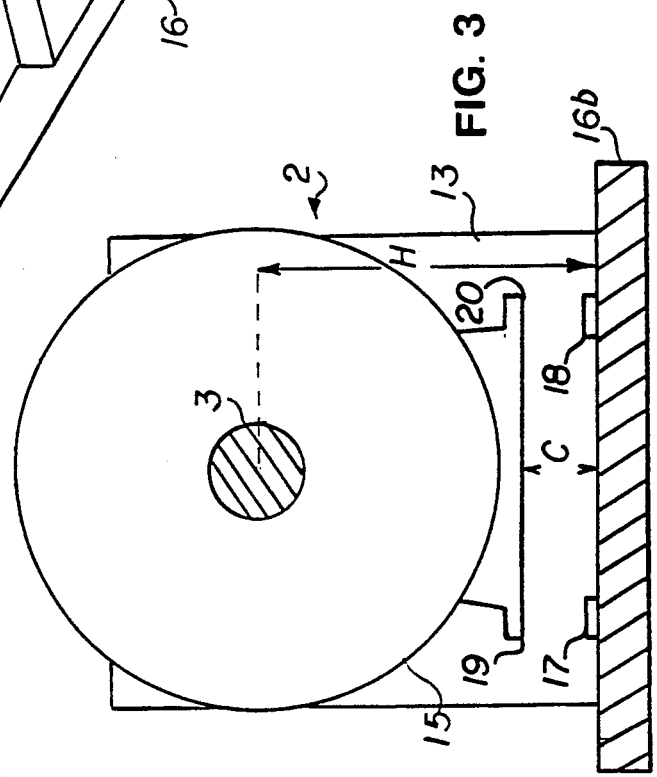
FIG. 2
FIG. 3

TRANSIENT-FREE SYNCHRONOUS ELECTRICAL POWER MACHINE

PRIOR APPLICATION

This is a continuation-in-part of co-pending U.S. patent application Ser. No. 680,543 filed Apr. 4, 1991, now abandoned.

FIELD OF THE INVENTION

This invention relates to rotating electric machines and to electric power generation and use. More specifically the invention relates to a heavy-duty synchronous motors and synchronous generators.

BACKGROUND OF THE INVENTION

Heavy duty electrical power motors and generators used to drive machinery as primary or back-up electrical power source, and particularly synchronous electrical motors and generators are subject to sudden variations in the magnetic flux between the rotor and stator windings everytime there is a phase shift between the rotor armature flux and the stator armature flux. Such a phase shift occurs upon sudden increase or decrease in the mechanical load or in the power fed to a synchronous motor, and sudden increase or decrease in the electrical load or the torque applied to a synchronous generator.

The sudden phase shift can produce substantial voltage transients that cannot be tolerated by a critical load of a generator, or that can be fed back on the line power to a motor.

Sensitive loads such as data processing equipment and medical instruments must nowadays be protected by heavy, cumbersome and costly filtering and regulating devices. Utilities must protect their installations against power surges fed back by a motor suddenly turned into a generator by use of circuit breakers and other safety devices which increase the risk of blackouts.

The instant invention results from an attempt to limit these undesirable spurious lines transients by attacking the problem at its source, i.e. inside the synchronous power machinery.

Uninterruptible power supply systems are provided for switching from a normal line supply of electric power to a standby or backup power supply in the event of interruption, failure or inadequacy of the normal power supply. For true uninterruptible power, the switching must be virtually instantaneous, and for cyclic power, without any change in phase, frequency or voltage.

Uninterruptible power supplies may require a transitional supply of power, such as a flywheel, to carry the load until the standby source of power can be brought up to speed and switched on-line. The flywheel may have to be combined with fast acting power loss sensors and solid state switches in order to keep flywheel weight and size reasonable. An example of a fast acting switch is shown in U.S. Pat. No. 4,827,152.

Many of the current uninterruptible power supplies may accomplish the switching quickly, but not without a significant flywheel weight. Depending upon rotating mass requirements, the flywheel may be a separate structure or incorporated in the construction of the motor, shaft, or rotor. For critical loads where even a small change in frequency can cause problems, flywheel size requirement may become unpractical. The flywheel large spinning mass also creates problems in startup and performance when acceleration or deceleration of the spinning mass is required.

Even fairly massive flywheels and fast acting switches may have to be supplemented by spinning stand-by, dual drives, and other devices. An example of additional devices required is shown in U.S. Pat. No. 3,458,710.

Holding cyclic electric power frequency and phase within tolerances for these additional devices for critical loads has also been a problem. Frequency changers (e.g., coupled rotating units at different phases at any one rotary position) and other complex devices have been used to control critical frequency and phase outputs from rotating electric machines for critical applications.

There is a need for a simpler and more effective power back-up system which can instantaneously detect any failure of the line power and synchronously switch to a stand-by power supply without resorting to massive kinetic energy storage device or complex phase and frequency maintenance circuitry.

SUMMARY OF THE INVENTION

The principal and secondary objects of the invention are:
to suppress spurious transients in synchronous motors and generators due to sudden changes in the power supply or load,
to automatically correct transitory phase shift between rotor and stator fluxes that may be caused by such changes,
to provide a quick reacting electric power sensor/switch to backup power supply; and
to provide the backup power at virtually the same phase and frequency without the need for complex control circuitry or significant flywheel mass.

These and other objects are achieved by dynamic stator windings that are free to rotatively oscillate around the rotor over a limited range in response to variations and reversal of magnetic forces between the rotor and stator as a result of sudden changes in power supply or load. This allows the rotating electric machine to continuously adjust or filter transients in mechanical or electrical inputs. When combined with proximity switches the dynamic stator causes a synchronous motor to turn into a synchronous generator upon loss of power. The repositioning of the stator windings signals changes in the operating conditions of the machinery; and simultaneously switches functions to maintain constant voltage and prevent the generation of transient voltages or harmonics.

In an import power position of the stator windings, the motor-generator acts as a motor driven by a normal electric power supply. The stator flux leads the rotor magnetic flux slightly, creating a torque on the rotor and a counter-torque on the stator. As the stator field weakens due to a loss or inadequacy of the line power, the counter torque also weakens, and the stator windings begins to turn with the rotor until the rotor and stator fields are in step, i.e., when virtually no current is generated or consumed to produce useful work. The motion of the stator can be used to trigger a switch to an alternate source of power without any transients being generated.

As the stator continues to rotate, the stator flux begins to lag the rotor magnetic flux slightly, allowing the motor-generator to generate or export electric power. The dynamic or floating stator can be allowed to adjust itself automatically to the proper flux angle between the rotor and stator. This effectively isolates the output electric power from variations in the electric input. It also lets the apparatus automatically adjust the power factor.

BRIEF DESCRIPTION OF THE DRAWINGS

FIG. 2 is a perspective view of power back-up and regulating motor and generator installation;

FIG. 3 is an end view of the motor-generator taken along line 3—3 of FIG. 2;

DESCRIPTION OF THE PREFERRED EMBODIMENT

Figure 1:
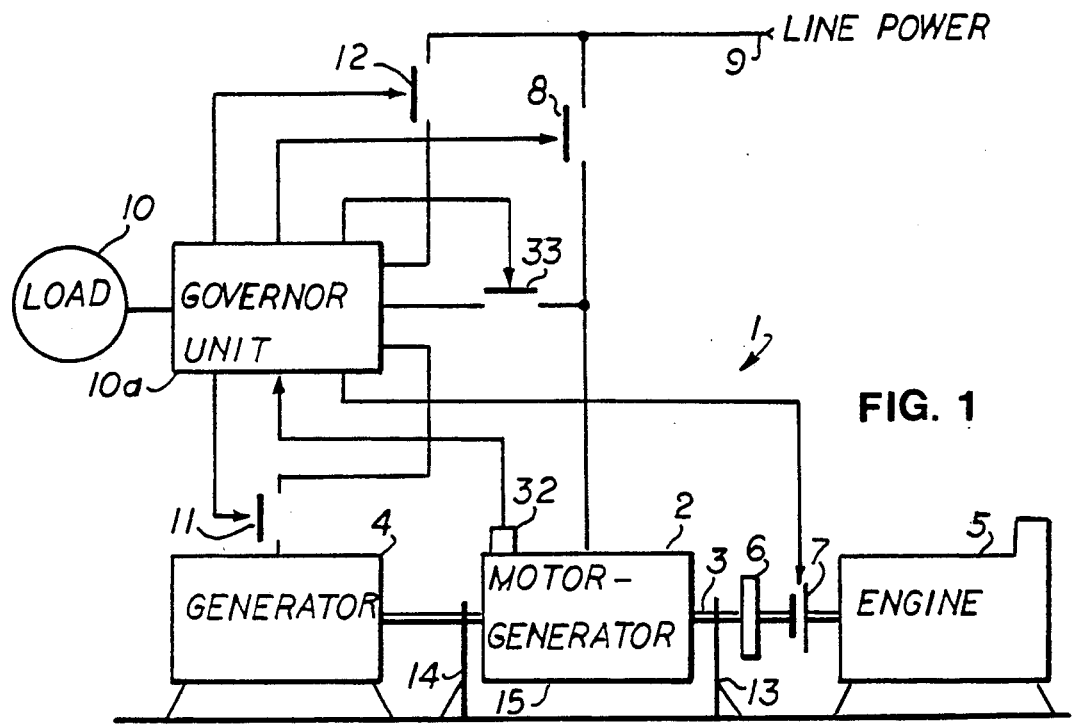
FIG. 1 is a schematic illustration of a floating stator motor-generator in a preferred uninterruptible power supply system.

Referring now to the drawing, there is illustrated in FIG. 1 a synchronous motor-generator 2 which acts as the key component of an back-up power supply system 1 to a critical load 10. One end of the shaft 3 of the motor-generator 2 is connected to a generator 4. A flywheel 6 is mounted on the opposite end of the shaft 3 which is engaged by a clutch 7 coupled to a thermal engine 5.

The motor-generator 2 is supported above ground at both ends of the shaft 3 by braces 13, 14. The casing 15 and the motor-generator stator mounted therein are allowed to partially rotate around the shaft 3 and rotor mounted upon it.

During non-critical periods of operation when the load 10 can tolerate variations in the power supply or even temporary failures of the power source, only the utility switch 12 is closed and the load 10 receives it power from the utility power line 9 through the electrical governor unit 10a. Under more demanding conditions during which transients in the power supply to the load 10 must be avoided, the motor-generator switch 8 and the generator switch 11 are also closed. The motor-generator 2 is energized by the utility power source 9 and acts as a synchronous motor driving the generator 4. The generator supplies power to the electrical load 10 through the governor control unit 10a, either alternatively or concurrently with the power line. The load 10 can be completely immunized against transient on the power line 9 by opening the utility switch 12, and leaving the generator 4 to supply the necessary power.

In a critical situation where failure of the power supply to the load 10 must be avoided, the thermal engine 5 is kept running, and the clutch 7 is engaged upon failure of the utility power source 9. The motor-generator switch 8 is opened. The thermal engine 5 begins driving the motor-generator 2 and the generator 4, assures a continuous, transient-free supply of electrical power to the load 10. Due to the particular arrangement of the motor generator 2 according to the invention, the switch over from the electrical power derived from the line 9 to the mechanical power provided by the thermal engine is also free of transient, voltage drop, frequency change, or phase shift. The line power can be reinstated by closing the motor-generator switch 8 and disengaging the clutch 7. The embodiment of the invention accomplishes this reversal of power supply without any detrimental effect on the power supplied to the load 10 by the generator 4.

Even a failure of the generator 4 can be palliated without interruption or deterioration of the power supplied to the load 10 by opening the generator switch 11 and closing the motor-generator switch 33.

It can be seen that changes in the source of the power drawn by the load 10 is accomplished not by direct switching of the load but by driving the motor-generator 2 either electrically from the power line 9 or mechanically with the thermal engine 5. Load 10 is insulated from this switch of power by the generator 4 and by the motor generator 2.

The thermal engine 5 may be an internal combustion engine, or a gas or steam turbine. An auxiliary hydraulic motor may be used to boost the power of the thermal engine to bring the flywheel to speed. The clutch 7 is preferably of the over-running type which disengages immediately when the motor-generator over-runs the thermal engine. Allowing the stator of the motor-generator 2 to circumferentially move during power switchover was found to yield many advantages. It is also advantageous to allow for a limited rotational movement of the stator in the generator 4 as well as in the motor-generator 2.

As previously disclosed in my U.S. Pat. No. 4,827,152, the movement of a loosely supported stator of a synchronous motor-generator can be sensed as an indication of a change of the supply voltage. This change can be sensed by a motion detector 32, and used to trigger a switch to an alternate power. The rotational movement of the stator may be allowed through diverse mounting schemes. In the earlier described situation, when the load 10 is powered from both the utility power source 9 and by the generator 4, the load sharing controls of the electrical governor unit 10a are preferably set to draw about 90 percent of the necessary power from the generator 4 and the balance from the power line source 9. Upon failure of either the power line source 9 or the backup system, the switching from either or both power sources to the alternate, or to a single source, is also regulated by the dynamic mounting of the stator of the motor-generator 2 as will be explained below.

FIGS. 2 and 3 illustrate a convenient way for dynamically supporting the stator of the motor-generator 2, which way is particularly adapted for use with conventional types of motor-generators in which the stator is welded to the inside of the casing.

While the casing of the generator 4 is bolted to the raised portion 16a of the slab 16, the casing 15 of the motor-generator 2 is floatingly suspended above the lower portion 16b of the slab. The forward end 3a of the shaft 3 which also supports the flywheel 6 and connects to the clutch 7, is supported by a first brace 13 through bearing 13a. The height H at which the shaft 3 is supported above the lower portion 16b of the slab substantially exceeds the distance from the shaft 3 to the underside of the casing 15. A second brace 14 supports through bearing 14a the opposite end 3b of the shaft 3 which connects to the shaft of the generator 4. This second brace may be omitted if the internal bearings of the generator 4 can withstand the added weight of the motor-generator 2.

The vertical clearance C between the casing 15 and the slab 16 must allow for rotational excursion of the casing around the shaft 3. A typical four-pole machine requires a rotational movement of the stator over 22.5 degrees in either direction. This corresponds to an 90 degree electrical phase shift. Accordingly, the minimum arcuate travel A of the stator is based on the number N of poles according to the following formula:

$$A = 180/N \text{ degrees}$$

The maximum range of rotation allowed should be slightly shorter than a 180 phase shift, for instance: 350/N degrees. This limit is established by placing stop-bumpers 17, 18 at appropriate heights on the surface of the slab 16b below the outer edges 19, 20 of the motor-generator foot.

Figure 4:
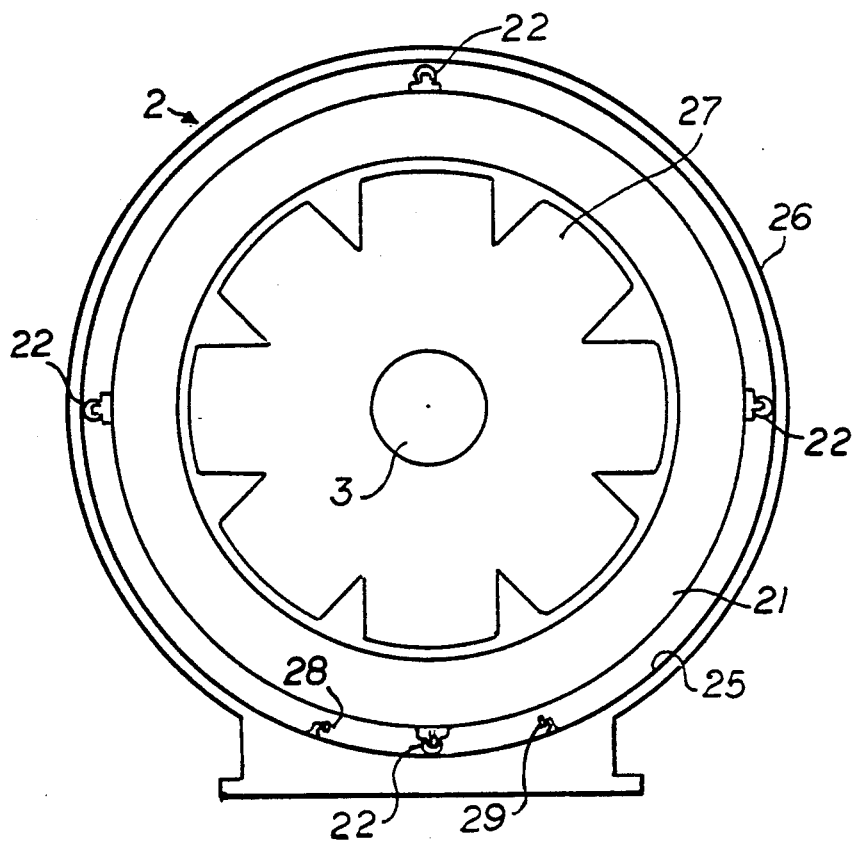
FIG. 4 is an end view of a motor-generator having an alternative floating stator mechanism.
Figure 5:
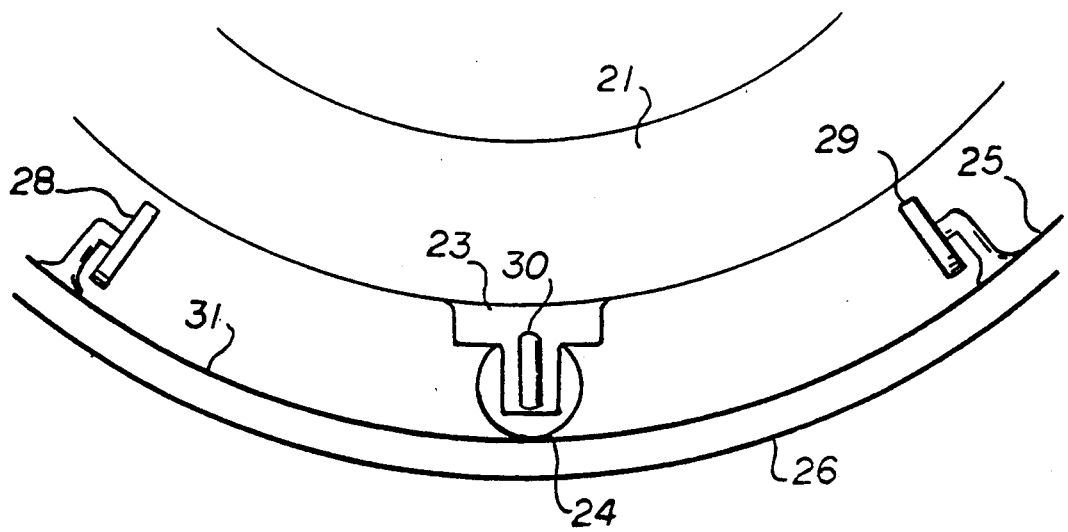
FIG. 5 is a detail section of the alternative floating stator mechanism shown in FIG. 4.

Another way to implement the dynamic suspension of the synchronous motor-generator stator is illustrated in FIGS. 4 and 5. Instead of welding the stator to the inside of the casing as is commonly done, the stator 21 is supported by a series of roller bearings 22. The carriage 23 of each roller bearing is welded to the stator 21, and the rollers 24 ride against the inner wall 25 of the circular casing 26. The rotational excursion of the stator 21 around the rotor 27 is stopped by a projection 30 on one of the roller bearing carriage 23 bumping against stops 28, 29 mounted on the inside surface 31 of the casing 26.

In this embodiment, the casing 26 is bolted to the supporting slab in a conventional fashion.

The advantageous operation of the dynamic stator arrangement of the synchronous motor-generator can be best understood by considering the movement of the stator during the change from the motor to the generator mode and vice versa.

When the motor-generator 2 of FIG. 1 is operating as a synchronous motor energized by the line power source 9, the stator magnetic flux leads the rotor magnetic flux. The resulting torque applied against the stator circumferentially forces the stator to its maximum allowed excursion opposite the rotational direction of the rotor.

Upon failure of the line power, the stator field disappears and the stator moves in the direction of the rotor. At this point, both stator and rotor fields are in step, and no current is generated. The sensor 32 detects the loss of power, and gives the signal to disconnect the line 9 and engage the clutch 7.

The progressive rotational movement of the stator during the metamorphosis of the machine from a synchronous motor to a synchronous generator delays the effect of the switch-over and consequently maintains, for a short time, the torque that the motor-generator applies to the generator 4 until the mechanical power of the thermal engine takes over. There is no abrupt drop of voltage or frequency, only a 90 degree phase shift in the power coming out of the generator. This phenomenon supplements the effect of the flywheel 6, therefore reducing its mass requirement, and in some applications, resulting in its complete elimination.

The reverse of the above-described phenomenon takes place in applications where the motor-generator 2 reverts from its role as a synchronous generator to a motor. When the machine is working as a synchronous generator, the stator magnetic flux lags the rotor magnetic flux. As the mechanical drive is being replaced by the electrical power from the power lines the progressive recoil movement of the stator maintains the power output allowing a smooth transition to the alternate power source.

Theoretically the synchronous motor rotating magnetic field should speed up slightly in order to have a transition-free change-over from motor to generator but this is not possible because it is the stator magnetic flux that generates that field, and when the stator magnetic flux weakens or disappears, the field automatically slows down causing high transient voltages.

The free movement of the stator causes a corrective magnetic flux change between the stator and rotor fields. The stator movement is natural and is caused by the change of torque between the stator and the rotor. In the case of a motor, the stator torque is counter to the rotation field torque. In the case of a generator, the stator torque and the shaft torque are in the same direction. Due to the relationship between torque, power and supply voltage, any change in power supply voltage will have a direct effect in the stator/rotor torque causing the stator movement to either absorb or generate a corrective amount of power.

Figure 6:
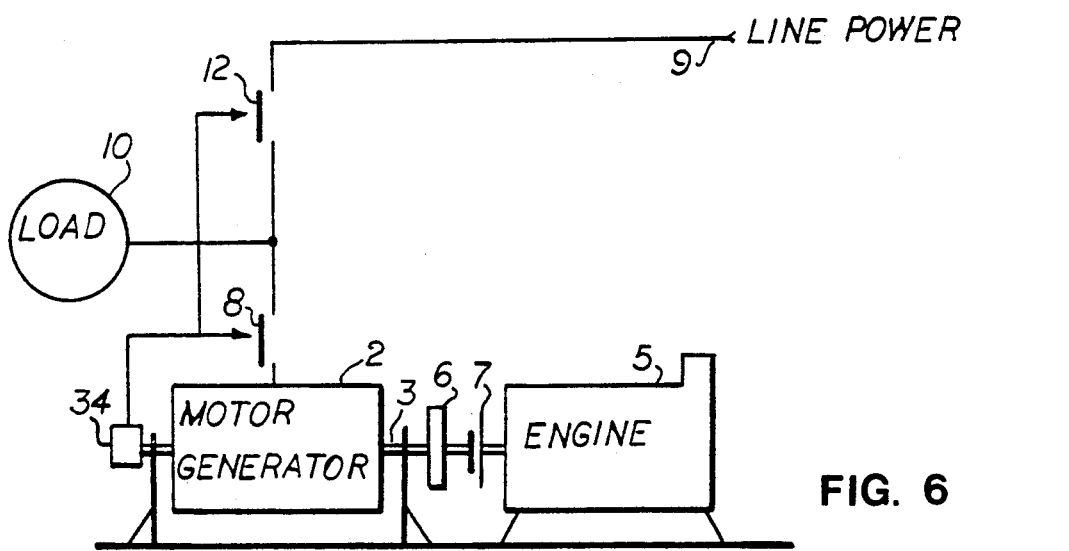
FIG. 6 is a schematic illustration of a second uninterruptible power supply system for less critical electric loads.

An alternative uninterruptible power supply system for less critical loads is shown in FIG. 6. The motor-generator 2 is brought up to speed by the thermal engine 5 and synchronized with the utility power 9. As the utility switch 12 and the motor-generator switch 8 are closed, the thermal engine 5 may be shutdown and clutch 7 disengaged, allowing the motor-generator 2 to act as a synchronous condenser-filter. The spinning flywheel 6 and rotor within the motor-generator 2 filters or smooths utility power transients and stabilizes voltage. Excess power can be absorbed virtually instantly by a change in position of the dynamically mounted stator of the motor-generator 2. Conversely, a nearly instantaneous shift in stator position regulates the power as required by variations of the load 10. Upon a voltage drop beyond a threshold limit or loss of utility power 9, utility switch 12 opens, thermal engine 5 starts, and clutch 7 engages to supply the load 10. If the load is more sensitive to loss of power than excess voltage such as utility power spikes, the thermal engine 5 may be kept running while line power 9 is being used to supply a portion of the load power continuously and to provide even faster and smoother switching of power sources.

Electrical switches can also be controlled by other devices in lieu or in addition to the one sensing the motion of the dynamic stator. Sensor 34 is shown as a tachometer which can also provide control signals for opening or closing electrical switches, in addition to or in lieu of a sensor tracking the motion of the stator of the motor-generator.

A conventional standby generator is normally isolated through a mechanically interlocked transfer switch. During utility failure, the load is switched from utility to standby; then switched back when normal power is restored. Each failure causes two interruptions to the load. Critical power users such as hospitals require that their emergency standby generators be exercised under full or partial loads at least once every two weeks. This can only take place during non-critical times since normal power has to be interrupted to exercise the system.

A standby power system, according to the invention allows the user to exercise the back-up power at any time. The motor generator 2 is brought up to synchronous speed via a thermal engine 5, and synchronized to the utility 9. Once the generator breaker 8 is closed the engine comes to stop and is disengaged through an over-running clutch 7.

The synchronous machine 2 becomes a synchronous motor (or synchronous condenser), corrects power factor, and helps maintain constant voltage. To exercise the power back-up system, it suffices to start the engine. When the over-running clutch mechanically engages the motor shaft, the stator no longer creates torque, and therefore it turns in the direction of the shaft rotation until it comes up to the stator stop position at which time the machine becomes a generator. The utility breaker 12 is automatically opened and the load 10 is now on emergency power. When the exercise period is over, a relay closes the utility breaker 12 at the proper synchronous time, the engine stops and as the stator flips back in a direction opposite the shaft rotation, the generator then becomes a synchronous condenser.

Figure 7:
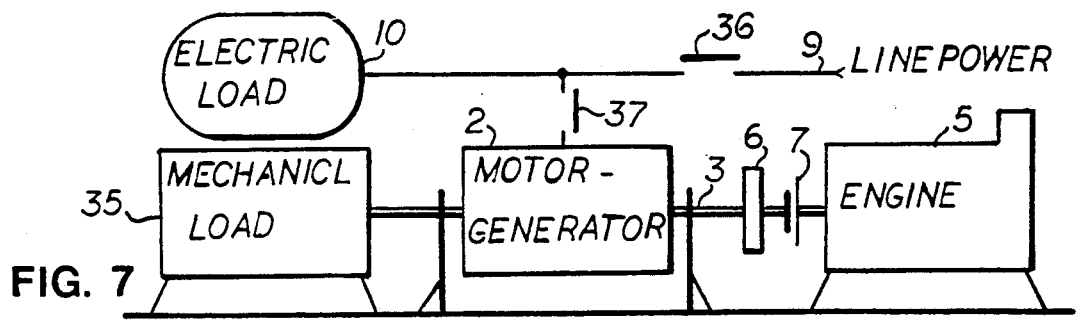
FIG. 7 is a schematic illustration of a third power supply system.

FIG. 7 illustrates another embodiment for supplying uninterruptible mechanical power and/or electric power. The thermal engine 5 can be used to start (i.e., soft start) the mechanical load 35 until the rotational speed of shaft 3 allows the motor-generator 2 to be synchronized with the utility power 9. Normal operation would have the utility switch 36 and motor-generator switch 37 closed, the thermal engine 5 shutdown and the clutch 7 disengaged. The motor-generator dynamic stator provides a cushion, filtering out transients that might otherwise be transmitted to the mechanical load 35. The mechanical load 35 may be pump or compressor, such as one that must supply a constant stream of fluid to a critical process.

When utility power is lost or inadequate, the dynamic motion of the motor-generator stator signals the power failure and simultaneously the motor generator 2 begins to generate power. The power failure indication triggers the start of the thermal engine 5 to fully supply mechanical power to the load 35. If the utility power 9 can be isolated, and the thermal engine 5 and motor-generator 2 sized accordingly, mechanical and electric power can be simultaneously supplied. The engine can also be kept running during the time line power 9 is available to completely protect the electrical load against any switch-over transient. The system can also provide peak shaving capability, that is, the mechanical load 35 may be driven in a cogeneration mode by the thermal engine 5 during peak time periods in order to reduce utility charges. The motor-generator 2 will correct for power factor and other unwanted electric power conditions.

The unique peak shaving ability is provided by the limited movement of the stator. For example, under normal conditions the motor-generator 2 driving a compressor 35 imports 300 amps at 600 volts. When the natural gas engine 5 is started during peak periods it provides some of the required shaft driving torque. During this time the stator will lose some of its counter torque and will move toward the transition or generation position depending on how much torque the engine is supplying. The engine power output can be preset through an electric governor import-export module. If the governor was set to 80% engine power, the synchronous motor would only import 60 amps during the peak shaving mode.

The many advantages of the present invention include providing cushioned motor to generator or generator to motor transitions, providing a synchronous motor-generator in a single machine, reducing or eliminating the need for reduced voltage or full voltage starters, eliminating electrical and mechanical transients, providing soft starts, providing a continuous transition between export and import electrical conditions, avoiding switching and switch transients, acting as a synchronous condenser to correct power factor and stabilize voltage, allowing two or more sources to drive the rotating unit, and supplying emergency, peaking, and uninterruptible electrical and mechanical power.

While the preferred embodiments of the invention have been described, modifications can be made and other embodiments may be devised without departing from the spirit of the invention and the scope of the appended claims.

WHAT IS CLAIMED IS:

1. In an electrical alternating power unit wired to maintain supply of power to at least one load upon lapse of an electrical power source, said unit including a synchronous electrical power machine comprising:
   casing, having a base shaped to rest on a supporting surface;
   a rotating shaft having first and second ends supported along a rotational axis by said casing;
   a first rotating armature of N poles fixedly mounted on said shaft inside said casing;
   a stator concentrically surrounding said armature and fixed within said casing;
   an improvement which comprises:
     a structure supporting said casing
     said structure being dimensioned to hold said casing above and spaced-apart from said supporting surface, and to allow unrestrained rotational movement of said casing and stator about said rotational axis over an arc of at least 180/N degrees and no more than 350/N degrees.

2. The improvement of claim 1, which further comprises means for connecting and disconnecting said electrical power source; and
   means for connecting and disconnecting a mechanical power source to and from said machine.

3. The apparatus of claim 2, which comprises a thermal engine; and
   means for selectively driving said power machine mechanically with said engine or electrically from said electrical power source.

4. The apparatus of claim 3, which further comprises means for sensing a rotational movement of said stator; and
   means for connecting and disconnecting said electrical power source and engine in response to said means for sensing.

5. An improved synchronous electrical power machine which comprises:
   a casing resting over a supporting surface;
   a rotating shaft;
   a first rotating armature of N poles fixedly mounted on said shaft; and
   a stator concentrically surrounding said armature;
   means for rotatively supporting said stator within said casing and for allowing unrestrained rotational movement of said stator about an axis coincident with said shaft over an arc of at least 180/N degrees and no more than 350/N degrees during continuous, synchronous operation of said machine and in response to variations in torque between said rotating armature and said stator resulting from variations in electrical power and in loads applied to said machines.

6. A self-adjusting electrical load for regulating and filtering an alternating electrical power source which comprises:
   a synchronous motor having a stator winding energized by said power source, an axial shaft and a rotor winding mounted on said shaft;
   a mechanical load driven by said shaft; and
   means for allowing unrestrained rotational movement of the stator winding around the shaft in response to variations of said power source, over an arc limited to maintain synchronous operation of said motor.

7. The apparatus of claim 6, wherein said means for allowing comprises means for letting said stator windings rotate over an arc of no less than 180/N degrees and no more than 350/N degrees, where N is the number of poles of said motor windings.

8. The apparatus of claim 7 which further comprises an electrical generator driven by said synchronous motor.

* * * * *